Dec. 18, 1962  A. P. HAYDEN ETAL  3,069,491
HELICAL SPRING WIRE TIE
Filed July 8, 1959  2 Sheets-Sheet 2
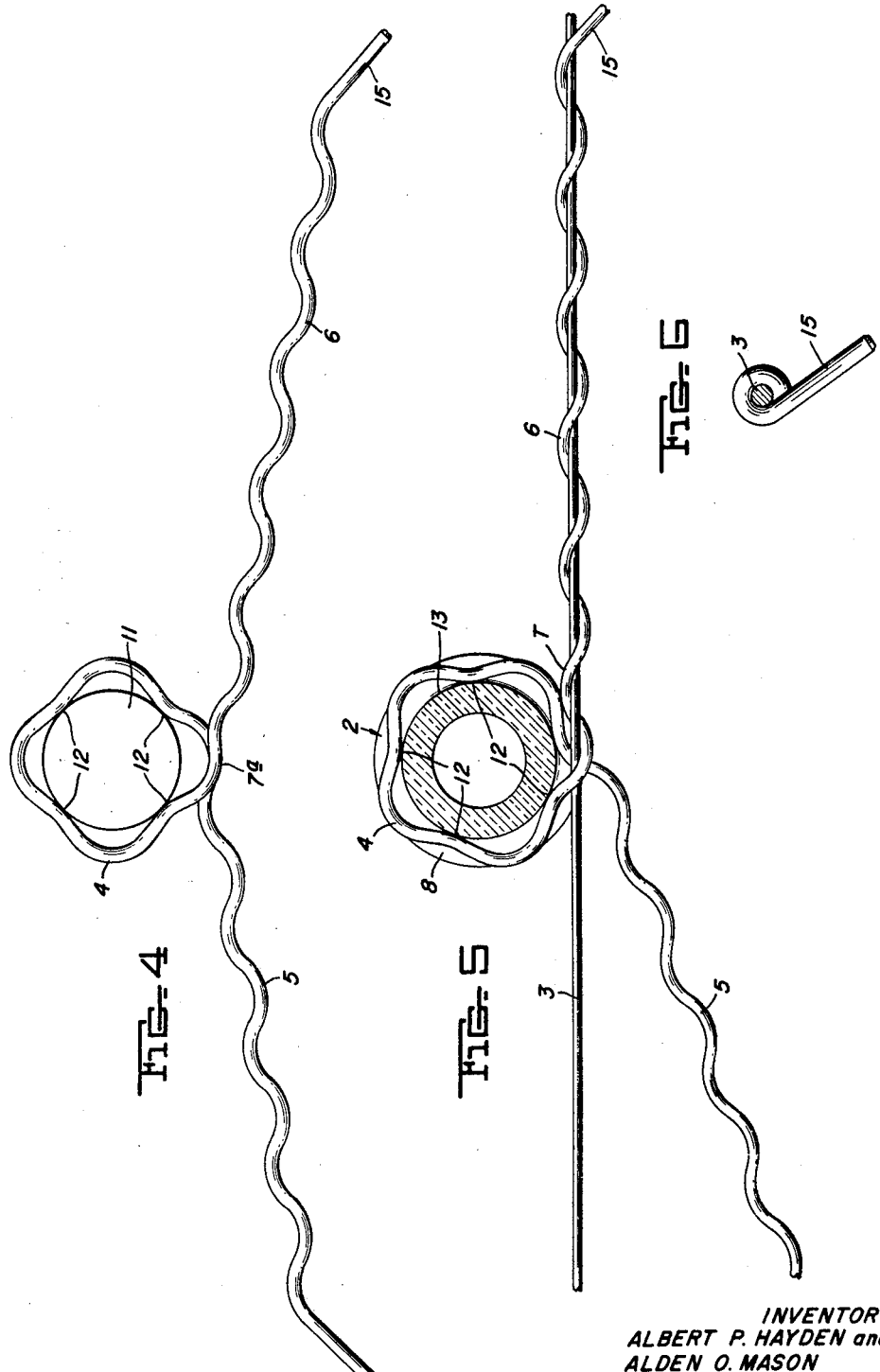
INVENTORS
ALBERT P. HAYDEN and
ALDEN O. MASON
By Donald G. Dalton
Attorney

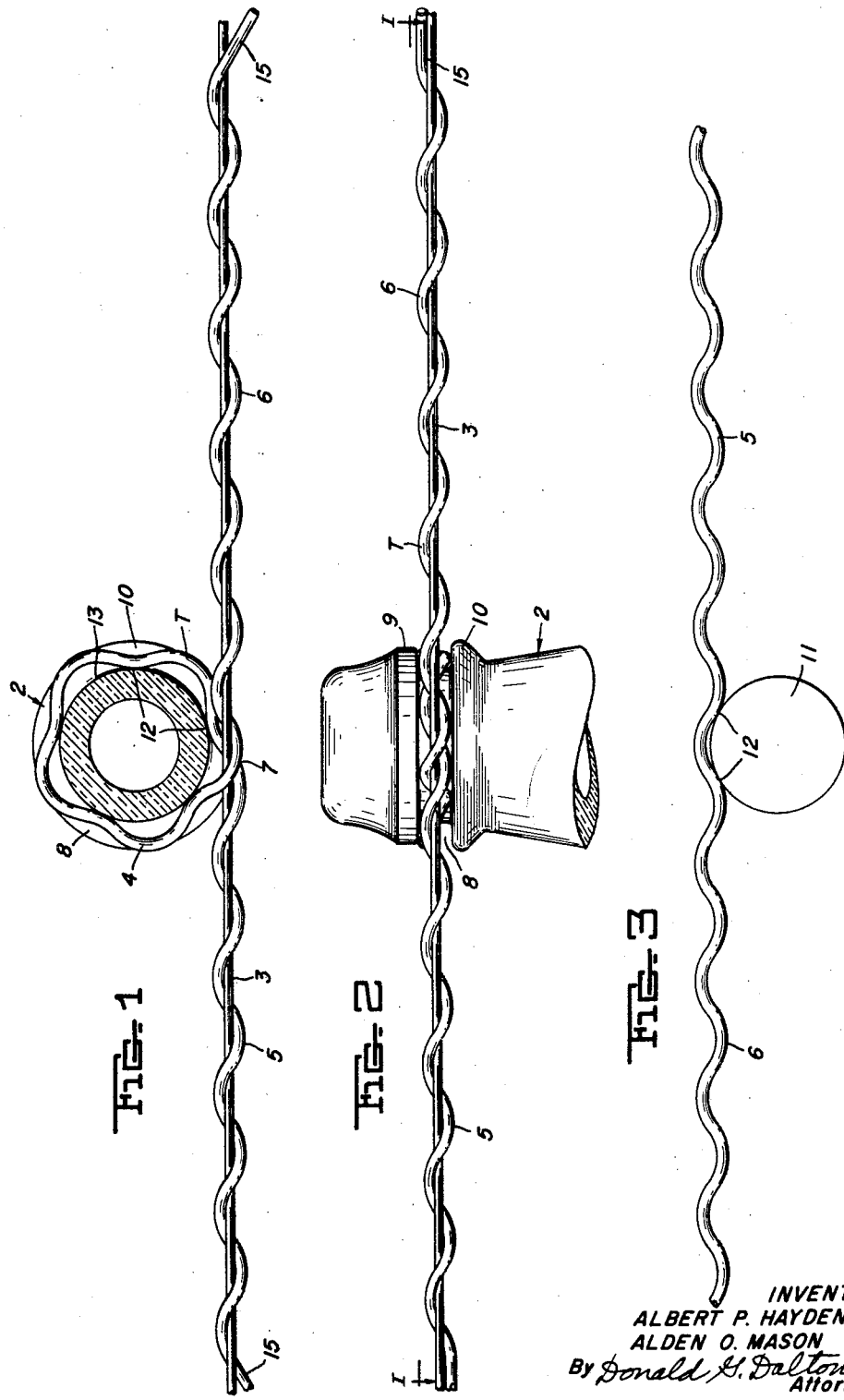

United States Patent Office 3,069,491
Patented Dec. 18, 1962

3,069,491
HELICAL SPRING WIRE TIE
Albert P. Hayden, Rocky River, and Alden O. Mason, Lakewood, Ohio, assignors to United States Steel Corporation, a corporation of New Jersey
Filed July 8, 1959, Ser. No. 825,839
3 Claims. (Cl. 174—173)

This invention relates to wire ties for securing conductor lines to insulator knobs on supporting poles and, more particularly, is directed to improvements that provide in the application of a wire tie to an insulator a self-tightening action, which utilizes the resilience of the wire in the tie and the tension of the line wire to hold both the conductor line and the tie against movement relative to the insulator on which they are assembled.

Wire ties and conductor lines fastened thereby on pole insulators are subject to metallic chafing and fretting as the result of wind induced vibration, and wear of this character has been a particularly troublesome problem in polyethylene coated rural telephone lines. While hard-drawn helical wire has been proposed for the fabrication of wire ties because of the advantages obtained with respect to reinforcement of the line wire supported thereby, previous proposals for this purpose have not proved entirely satisfactory for the reason that, generally stated, they have either been ineffective in eliminating wind induced vibration and the resulting wear of the tie and conductor line, or have required complicated fasteners or the use of special tools that rendered their assembly to insulator knobs in the field both time consuming and troublesome. This invention accordingly has as one of its principal objects the provision of a conductor line wire tie of simplified construction that may be assembled readily in the field without the need of special tools or fasteners and which when assembled is effective in eliminating metallic chafing and fretting wear of both the wire tie and the conductor line supported thereby.

According to a preferred practice the wire tie of this invention is fabricated from helical spring wire that is cut to length and then shaped by bending about a cylindrical mandrel to form a single center loop having ends that cross at one side of and project outwardly from such center loop. When the center loop is applied to an insulator in a manner to be described, the crossed ends extend along lines that diverge outwardly from the center loop and define an angle, preferably obtuse, which opens outwardly therefrom. Being helical the crossed ends are conveniently attached to a line wire by winding thereon, but this requires that they be spread by springing to positions aligned with the line wire. When the crossed ends are sprung in this manner, the center loop is resiliently contracted into tight clamping engagement with the insulator knob and upon attachment of its ends to the line wire the tension of the line wire is effective to maintain this resilient clamping action.

A further object of the invention is to provide a helical spring wire tie of the character described which grips the line wire with such force that it is effective to maintain the line wire in a supported position on a pair of adjacent poles after breakage in the span of line wire therebetween.

Other objects and advantages of the invention will become apparent from the following description.

The drawings show a preferred embodiment of the invention and furnish an illustration of the manner in which the wire tie is fabricated and assembled on an insulator knob in supporting and fastened relation with respect to a conductor line wire. In this showing:

FIGURE 1 is a view taken along the line I—I of FIGURE 2 which shows an insulator knob in horizontal section and the wire tie of this invention is assembled position fastening a conductor line wire thereto;

FIGURE 2 is an elevation of the assembly shown in FIGURE 1;

FIGURES 3 and 4 are views illustrating sequential steps in the formation of the wire tie of this invention and the manner in which it is fabricated by bending helical spring wire stock about a mandrel;

FIGURE 5 is a view similar to FIGURE 1 which shows the wire tie of this invention in a partially assembled position on an insulator knob and a line wire; and FIGURE 6 is a detail end view looking at the terminal of one of the ends of the tie wire shown in the preceding figures.

FIGURES 1 and 2 of the drawings show the wire tie T of this invention in its assembled position with respect to an insulator knob 2 and a conductor line 3. The tie T is formed from a single length of helical wire and comprises a center loop or portion 4, and ends 5 and 6 that cross at a point 7 at one side of the loop 4 and project tangentially outwardly therefrom in opposite directions. The center portion 4 is received in a side groove 8 in the insulator knob 2 and the end portions 5 and 6 are wrapped about the conductor line 3 with their helical convolutions extending concentrically with respect thereto. The tie T is fabricated from hard-drawn medium spring wire stock that is preformed in the shape of an open wound helix, which has pitch several times its outer diameter and an inner diameter slightly less than the outer diameter of the line wire 3, so that the ends 5 and 6 will engage the wire 3 with a tight grip when wound thereon. The helix of the wire in the tie T has an outer diameter than corresponds as shown in FIGURE 2 to the axial spacing of the flanges 9 and 10 on the insulator 2 that define the groove 8 so that the center portion 4 has a snug fit between the flanges 9 and 10 to prevent its tilting downwardly, or vibrational movement thereof with respect to the insulator knob 2.

As will be apparent from the FIGURES 3 and 4, the center portion or loop 4 is precast by manually bending the helical wire about a cylindrical mandrel 11 which has a diameter that is smaller than the inner diameter of the groove 8 of the insulator knob on which the tie T is to be assembled. This is accomplished by first placing the wire as shown in FIGURE 3 with two points 12 at the ends of a center helix or spiral thereof engaged with the mandrel 11. The positions of the ends 5 and 6 are then reversed by twisting about the mandrel 11 so that they cross at the point 7a (see FIGURE 4) and project outwardly therefrom in opposite directions along lines which extend generally tangentially relative to the center portion 4. Bending of the wire in this manner causes the center portion 4 to engage the mandrel 11 at two additional points 12, and it will be noted that the points 12 are disributed circumferentially about the mandrel 11 over an angle less than 360° and are arranged symmetrically with respect to a diametral line extending through the crossover point 7a. When the ends 5 and 6 are twisted about the mandrel 11, they are preferably twisted to positions that are axially aligned with each other and, as a consequence, spring to the relative angular positions shown in FIGURE 4 when the manual twisting force is released. In the position shown in FIGURE 4, the ends 5 and 6 project along lines that diverge outwardly from the center loop 4 and form a flat obtuse angle, which has its apex at the point 7a and opens outwardly with respect to the center loop 4. In a manner to be described this angular arrangement of the ends 5 and 6 results in the center loop 4 being tightened on an insulator 2 when the tie T is assembled thereon.

In order to provide a center loop 4 having circumferentially distributed points of contact 12 as described above, spring wire stock is preformed with a helical pitch that is slightly less than the diameter of the mandrel 11. For example, a wire tie T, for attaching .109" diameter line wire 3 to a glass knob 2 having an outer diameter of 2⅝" and a root diameter of 2" at the inner surface 13 of the groove 8, is preformed from #10 gauge (.135") helical spring wire that has a pitch of 1½" by winding about a mandrel 11 having a diameter of 1¾". With reference to FIGURE 3, the helical pitch (1½") of the wire in the tie T is the distance between the points 12 before bending around the mandrel 11. The spring wire stock is preformed with a helix that has an inner diameter of .090–.095", which is less than the diameter (.109") of the line wire 3 so that the ends 5 and 6 have a tight and snug grip on the line wire when wound thereon in a manner to be described.

Assembly of the tie T on an insulator knob 2 is effected by grasping and pulling the ends 5 and 6 toward each other to enlarge the center loop 4 so that it may be moved downwardly over the knob 2 to engage in its side groove 8. When the ends 5 and 6 are released, the resilience of the wire loop 4 contracts it and the points 12 engage with the bottom 13 of the groove 8. Since the loop 4 is enlarged when applied to the insulator groove 8 in this manner, a larger number of points 12 engage the inner groove surface 13 compared to the points of mandrel engagement shown in FIGURE 4, and the wire tension produced by enlargement of the loop 4 in this manner is effective to maintain such points tightly engaged with the groove bottom 13. In addition, it will be noted that the enlargement of the loop 4 springs the ends 5 and 6 toward each other and decreases the obtuse angle therebetween.

After mounting in an insulator groove 8 the tie T is attached to a line wire 3 to secure and support it on the insulator 2, and this is accomplished by winding the ends 5 and 6 about the line 3. According to preferred practice this is done in such manner that the line 3 is held against the inner side of the cross-over point 7, that is, between the point 7 and the groove surface 13, as shown in FIGURES 1 and 5. An attachment of this character is effected by first arranging the ends 5 and 6 in relative positions above and below the line wire 3 and with the line wire 3 between the cross-over point 7 and surface 13, as shown in FIGURE 5, and then winding that end which is uppermost (the end 6 in the arrangement shown in FIGURE 1) on the line 3. After securing one end to the line 3 in this manner, the other end (the end 5 in FIGURE 1) must be sprung in a direction that increases the angle between the ends 5 and 6, and to a position in which such ends are axially aligned with each other and the line wire 3, so that it may be attached by winding thereon. The springing of the ends 5 and 6 for this purpose further tensions the center loop 4 and tightens its grip about the insulator 2. This increase in tension resiliently flattens the helices of the center loop 4 with the result that the points of engagement 12 shift slightly in a clockwise direction when the end 5 is attached to the line wire as will be apparent from a comparison of FIGURES 5 and 1. After assembly is completed by attachment of both ends 5 and 6 as shown in FIGURES 1 and 2, the tension of the line wire is effective to prevent return movement of the arms 5 and 6 and to maintain the tie T assembled relative to the insulator and line wire 3.

With reference to FIGURE 1, attention is particularly directed to the fact that the wire tie assembly described above operates to hold the line wire 3 tightly against the inner side of the cross-over point 7. Since the cross-over 7 is spaced outwardly from the base 13 of the groove 8 by reason of the helical shape of the wire in the center loop 4, it will be apparent that this arrangement is effective to securely hold the line 3 out of rubbing or chafing engagement with the insulator, and to secure all parts of the assembly against wind induced vibration of the line wire 3. While the particular arrangement shown in FIGURE 1 represents the preferred practice of the invention, it will be apparent that the tie T is capable of being assembled with the line 3 positioned on the outer side of the cross-over point 7, but in an arrangemetn of this character the tension of the line 3 would press radially inwardly against the cross-over point 7 with the result that the grip of the center loop 4 on the insulator would not be as tight as provided by the preferred arrangement shown in FIGURE 1.

The wire tie T of this invention requires, as indicated above, that it be fabricated from medium spring wire stock in order that the center loop 4 and the ends 5 and 6 will have the spring resilience essential to a tight and vibration-free connection. For this purpose the tie T should be made from steel containing from .45% C to .70% C, and preferably from steel containing carbon in the range of from .55% C to .65% C. Generally stated, higher carbon steel will be too stiff for manual application of the tie T to a line wire, and the lower carbon steels will be too soft and would not provide the necessary tension for the center loop 4 and ends 5 and 6. In addition, the tie T, after being formed on the mandrel 11 as shown in FIGURE 4, should be tempered by heat treating to a temperature of 550° F. to raise its yield point by relieving the stresses formed during bending the wire about the mandrel 11. Heat treatment of this character is necessary in order that the center loop will not take a permanent set when the tie is opened up to snap over an insulator 2 into the groove 8 as described above.

In order to facilitate removal of the tie T from a line wire, the terminal 15 of each of the ends 5 and 6 is angled outwardly along a straight line as best shown in FIGURE 6. The angular arrangement of the terminals 15 in this manner provides a manual grip by which unwinding of the helical wire with respect to the line 3 may be initiated.

The preferred embodiment of the invention in which the tie T is formed from spring wire stock that is spiral from one end to the other and is thus continuous through the center loop 4 provides several advantages. As mentioned above, the spiral wire in the center portion 4 eliminates vertical vibration by reason of its snug engagement between the flanges 9 and 10. In addition it provides for engagement at circumferentially spaced points 12 and furnishes an improved spring action compared to that which would be provided by wire that is not spiralled. The spiralling of the wire further provides a crossover point 7 that is spaced outwardly relative to the insulator groove bottom surface 13 so that it operates to hold the line wire 3 out of engagement with the insulator 2.

While one embodiment of my invention has been shown and described it will be apparent that other adaptations and modifications may be made without departing from the scope of the following claims.

We claim:

1. A conductor line tie-wire support comprising, the combination with an insulator knob having an annular side groove, and a conductor line, of a hard-drawn helical spring wire having a center loop and crossed ends projecting outwardly in opposite directions from said center loop, said center loop being precast to the form of a circle having a diameter slightly less than the minimum diameter of said insulator knob side groove, said center loop being received in said side groove and being expanded thereby in such manner that its helical convolutions have contact and clamping engagement at circumferentially spaced points about said insulator knob, and said ends being wound about said conductor line whereby tension on said line is effective to spring said ends to resiliently contract said center loop about said insulator knob, said ends further operating to hold said conductor line against the point at which said ends cross and out of engagement with said insulator knob.

2. A tie-wire support as defined in claim 1 characterized by said conductor line extending through said center loop between the inner surface of the said annular side groove in said insulator knob and the said point at which said ends cross.

3. A tie-wire support as defined in claim 1 characterized further by said ends being wound on said conductor line from starting positions respectively located above and below said conductor line.

References Cited in the file of this patent

UNITED STATES PATENTS

| | | |
|---|---|---|
| 2,202,538 | Selquist | May 28, 1940 |
| 2,897,256 | Kitselman et al. | July 28, 1959 |
| 2,911,695 | Knight et al. | Nov. 10, 1959 |
| 2,941,029 | Stoeckel | June 14, 1960 |